United States Patent [19]
Yanagisawa et al.

[11] Patent Number: 5,560,506
[45] Date of Patent: Oct. 1, 1996

[54] BOTTLE WITH A HANDLE

[75] Inventors: Tateo Yanagisawa; Hisayoshi Yamada; Katsumi Sakamoto; Seiki Inagawa, all of Hiratsuka; Yukihide Umetsu; Takeshi Uchida, both of Tokyo; Hideyo Nakahara; Yoshiharu Fukumoto, both of Hiratsuka, all of Japan

[73] Assignee: Mitsubishi Plastics Industries Limited, Tokyo, Japan

[21] Appl. No.: 247,276

[22] Filed: May 23, 1994

Related U.S. Application Data

[63] Continuation of Ser. No. 56,938, May 5, 1993, Pat. No. 5,338,503, which is a continuation of Ser. No. 778,111, Dec. 12, 1991, abandoned.

[30] Foreign Application Priority Data

| Apr. 12, 1990 | [JP] | Japan | 2-96954 |
| Apr. 18, 1990 | [JP] | Japan | 2-102092 |
| Apr. 18, 1990 | [JP] | Japan | 2-102093 |
| May 22, 1990 | [JP] | Japan | 2-53294 |
| Jul. 26, 1990 | [JP] | Japan | 2-198496 |
| Nov. 8, 1990 | [JP] | Japan | 2-303052 |

[51] Int. Cl.$^6$ ............................................. B65D 23/10
[52] U.S. Cl. ........................ 215/398; 215/396; 220/752
[58] Field of Search ................... 215/100 R, 100 A, 215/1 C, 396, 397, 399, 385, 383, 384, 398; D9/549, 556, 559; 220/752, 759, 770

[56] References Cited

U.S. PATENT DOCUMENTS

| 3,140,329 | 7/1964 | Mutting . | |
| 4,016,995 | 4/1977 | Frazer . | |
| 4,257,525 | 3/1981 | Thompson | 215/396 |
| 4,915,241 | 4/1990 | Morimura et al. | 215/100 A |
| 4,952,133 | 8/1990 | Hasegawa et al. | 215/100 AX |
| 4,955,491 | 9/1990 | Marshall et al. . | |
| 4,964,522 | 10/1990 | Umetsu et al. | 215/100 A |

FOREIGN PATENT DOCUMENTS

| 0336988 | 10/1989 | European Pat. Off. . | |
| 8909551 | 12/1989 | Germany . | |
| 4031249 | 2/1992 | Japan | 215/100 A |

OTHER PUBLICATIONS

Database WPI, Derwent Publications, AN–85–200148, JP–60–125633, Jul. 4, 1985.

Patent Abstracts of Japan, vol. 13, No. 118 (M–806), Mar. 23, 1989, JP–63–294352, Dec. 1, 1988.

*Primary Examiner*—Allan N. Shoap
*Assistant Examiner*—Christopher J. McDonald
*Attorney, Agent, or Firm*—Oblon, Spivak, McClelland, Maier & Neustadt, P.C.

[57] ABSTRACT

A method of making a bottle with a handle, wherein a synthetic resin parison is disposed in half-cylindrical molds with a handle body, which is blow-molded and at the same time integrated with the handle body, characterized in that the parison is disposed between the opened molds; the handle body is tacked to a face of matching faces of the half-cylindrical molds; the molds are closed; and the blow-molding is performed.

8 Claims, 14 Drawing Sheets

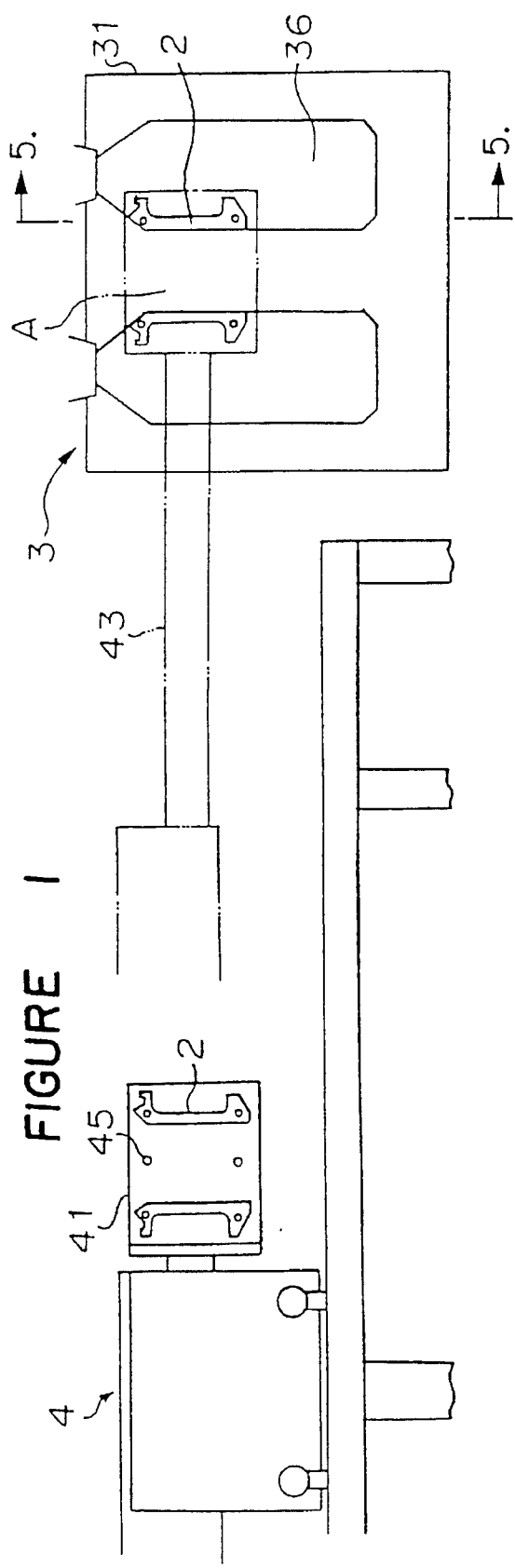
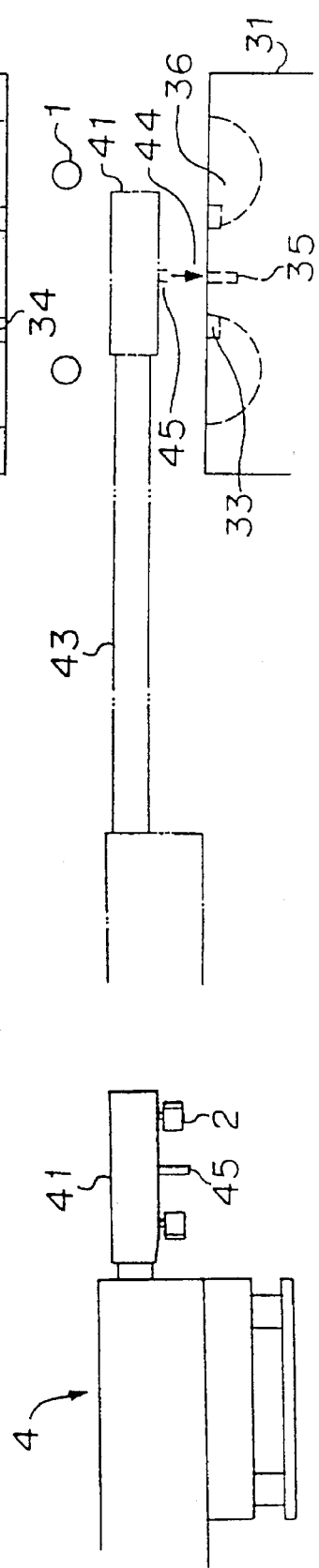

FIGURE 3
FIGURE 4
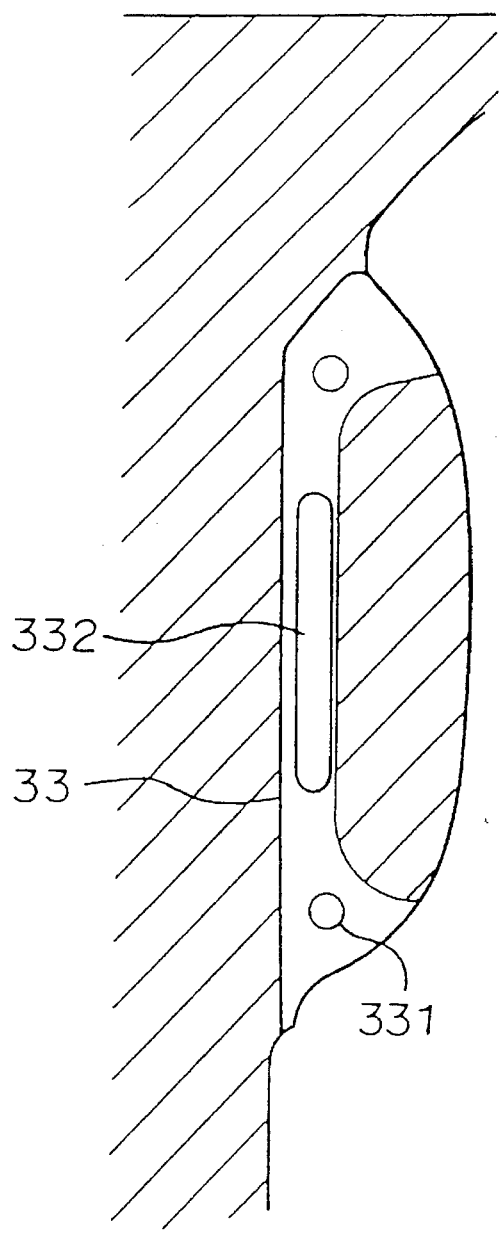
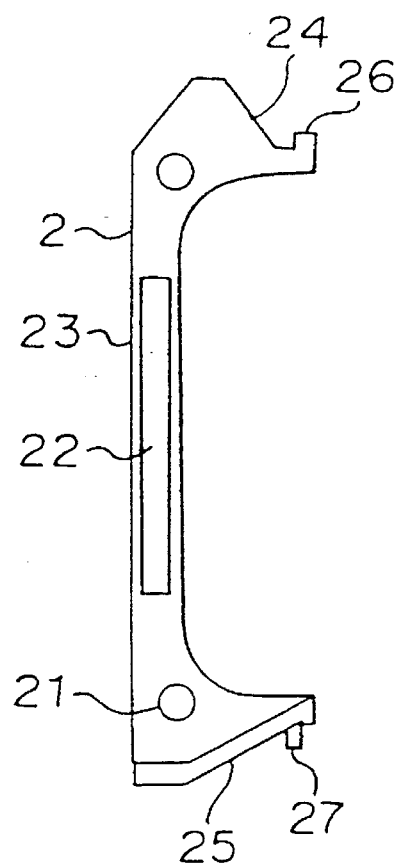

BOTTLE WITH A HANDLE

This is a continuation of appliation Ser. No. 08/056,938, filed on May 5, 1993, now U.S. Pat. No. 5,338,503, which is a continuation of Ser. No. 07/778,111, filed on Dec. 12, 1991, abandoned.

TECHNICAL FIELD

This invention relates to a method of making a bottle with a handle, and exactly a method wherein a parison made of synthetic resin is blow-molded and at the same time integrated with a handle body.

BACKGROUND ART

Conventionally, a method is proposed, wherein in case of a synthetic resin bottle which is hard to form integrally with a handle, due to a resin property thereof as in polyethylene terephthalate, a synthetic resin parison and a handle body are separately formed, the handle body is inserted into a forming mold by a handle holder, the synthetic resin parison is transferred to the forming mold, the forming mold is closed, and the blow-molding is performed (Japanese Unexamined Patent Publication No. 99350/1983).

DISCLOSURE OF THE INVENTION

In the above conventional method, since the forming mold is closed while the handle body is being held by the handle holder, there are problems in which attaching position of the handle is restricted, and in a forming mold in which a plurality of bottles each having a handle are simultaneously produced, when a plurality of handle bodies are to be attached, without being collided with a plurality of synthetic resin parisons, the number of handle holders is increased, and the operation becomes complicated, by which a forming apparatus becomes a large scale one.

This invention aims to solve the above problems by utilizing half-cylindrical molds of the forming mold, and the gist is a method of making a bottle with a handle, wherein a synthetic resin parison is disposed in half-cylindrical molds with a handle body, which is blow-molded and at the same time integrated with the handle body, characterized in that the parison is disposed between the opened molds; the handle body is tacked to a face of matching faces of the half-cylindrical molds; the molds are closed; and the blow-molding is performed.

BRIEF DESCRIPTION OF DRAWINGS

The following detailed explanation will be given to the present invention based on the following drawings.

FIG. 1 is an outline front view (to facilitate the understanding, an inside face of the half-cylindrical mold 31 at front side of the paper is shown by bold lines) showing an example of an apparatus for executing the method of making a bottle with a handle of the present invention;

FIG. 2 is a plan of FIG. 1;

FIG. 3 is an enlarged view of A portion of FIG. 1;

FIG. 4 is a front view of a handle body;

BEST MODE FOR CARRYING OUT THE INVENTION

Figure 5:
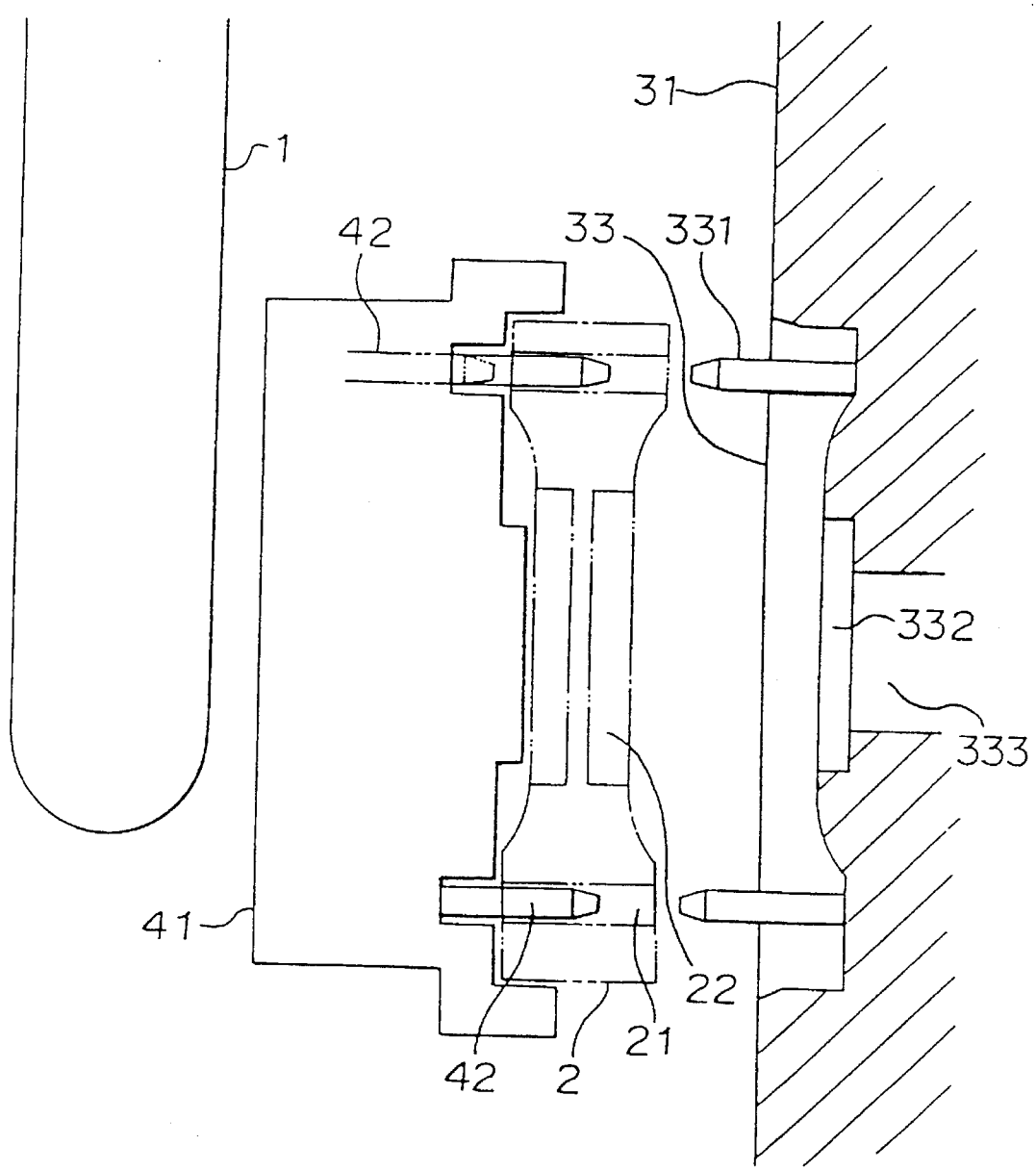
FIG. 5 is a sectional view taken along the line B—B of FIG. 1.

In FIGS. 1 through 5, a reference numeral 1 designates a synthetic resin parison, 2, a handle body, 3, a forming mold, and 31 and 32, half-cylindrical molds respectively. Reference numerals 33 and 34 designate handle fitting grooves provided at matching faces of the half-cylindrical molds respectively, wherein as shown in FIG. 3, a groove having a shape fitted to roughly an outline shape of the handle body 2 is formed, and the depth of the groove is determined so that about half of the handle body 2 in its thickness is fitted thereto. Furthermore, in this example, as shown in FIGS. 3 and 5, the retaining pin 331 is studded in the handle fitting groove 33 of a half-cylindrical mold, which can be inserted into the through hole 21 provided at the handle body 2 shown in FIG. 4. Furthermore, in this example, as shown in FIGS. 3 and 5, the suction hole 332 is provided at the bottom face of the fitting groove 33, so that the handle body 2 can be adsorbed by sucking air from the suction passage 333 when the recess portion 22 of the handle body 2 contacts thereto.

Moreover, in FIGS. 1 and 2, a numeral 4 designates an attaching device for attaching the handle body 2 to the half-cylindrical mold 31. The attaching device 4 is provided with the attaching head 41 at its end, and as shown in FIG. 5, the attaching pin 42 is formed in the attaching head 41, which can be inserted into the through hole 21 of the handle body 2 and can be maintained therein. Furthermore, as shown in FIGS. 1 and 2, the attaching head 41 can move between the opened forming mold 3 by telescopic motion of the attaching arm 43 and the forward moving and the backward moving of the attaching device 4 per se.

Furthermore, the attaching head 41 is pushed to the half-cylindrical mold 31 as shown by the arrow mark 44 of FIG. 2, by horizontally moving the attaching arm 43 perpendicular to the direction of the telescopic movement. At this moment, the head positioning pin 45 which is formed at the attaching head 41, engages with the positioning hole 35 of the half-cylindrical molds 31, and is pushed to an exact position.

The attaching pin 42, as shown in FIG. 5, is retractable in the attaching head 41, and is pushed by the retaining pin 331 when it is pushed by the half-cylindrical mold 31, and is retracted in the attaching head.

By the way, in this example, the forming mold 3 is for two products and accordingly, pairs of mold faces 36 are dug in the half-cylindrical molds, respectively, between which pairs of handle fitting grooves 33 and 34 are formed.

Furthermore, the attaching pins 42 which are formed in the attaching head 41 are provided at two locations corresponding with the handle fitting grooves 33 and 34.

As shown in FIGS. 1 and 2, the forming mold 3 is opened and the parison 1 heated at an elongation temperature is transferred therebetween. As shown in FIG. 2, the half-cylindrical mold 31 on one side is opened to a degree more than the one on the other side, and a larger space is provided between it and the parison 1. The attaching head 41 moves forward in the space. The handle body 2 is retained in the attaching head 41, by fitting the attaching pin 42 into the through hole 21 of the handle body 2. As shown in FIG. 4, in the handle body 2, the through holes 21 are formed on the upper side face and the lower side face thereof, and the recess portion 22 which is concave inwardly, is formed on the side face of the grasping portion 23. As this handle body 2, one which is produced by injection molding of, for instance, polypropylene, polyethylene, polyethylene terephthalate resin, can be utilized.

The handle body 2 is provided with the attaching portions 24 and 25 extending forward, at the top and the bottom of the grasping portion 23, at the ends of which the engaging protrusions 26 and 27 are formed. At the same time in which the synthetic resin parison 1 is blow-molded, the wall portion thereof surroundingly wraps up the engaging protrusions 26 and 27, by which the handle body 2 is attached to the bottle.

The attaching head 41 which moves in between the forming mold 3, is pushed in the direction of the half-cylindrical mold 31 as shown by the arrow mark 44 of FIG. 2, while the head positioning pin 45 is engagingly pushed to the positioning hole 35, and as shown in FIG. 5, the retaining pin 331 of the half-cylindrical mold 31 invades into the through hole 21 of the handle body 2, and at the same time pushes the attaching pin 42, and accordingly, the attaching pin 42 is retracted in the attaching head 41, and about half of the handle body 2 is sunk in the handle fitting groove 33 of the half-cylindrical mold 31, being transferred to the groove, by which the tacking attachment is completed. After that, the attaching head 41 leaves from the half-cylindrical mold 31, retracts from the forming mold 3, and returns to the original position of the attaching device 4.

At the same time in which the handle body 2 contacts the bottom portion of the handle fitting groove 33, air is sucked from the suction hole 332, by which handle body 2 is adsorbed and firmly secured in the handle fitting groove 33.

At this moment, the two handle bodies 2 are simultaneously and firmly attached thereto.

In this state, the respective half-cylindrical molds 31 and 32 are closed toward the synthetic resin parison 1, and the parison 1 and the handle body 2 are firmly secured by the forming mold. The blow-molding is performed by blowing highly pressurized air into the parison, and at the same time, the parison 1 is integrated with the handle body 2. After the thus obtained bottle with a handle is cooled and solidified, the forming mold 3 is opened again, and the completed bottle is removed.

Moreover, in the above explanation, the handle body is prevented to drop off from the matching face of the half-cylindrical mold by utilizing both the retaining pin 331 and the sucking hole 332, however, naturally, the dropping off can be prevented by utilizing each of them.

As stated above, since this is a method of making a bottle with a handle, wherein a synthetic resin parison is disposed in half-cylindrical molds with a handle body, which is blow-molded and at the same time integrated with the handle body, characterized in that the parison is disposed between the opened molds; the handle body is tacked to a face of the matching faces of the half-cylindrical molds; the molds are closed; and the blow-molding is performed, and the handle body itself is transferred to the half-cylindrical mold, and the forming mold can be closed in such a state, and accordingly, it is not necessary to restrict the position to which the handle body is attached, and in case of producing a plurality of bottles each having a handle, they can smoothly be produced by freely providing a plurality of parisons and a plurality of handles in a single forming mold at their predetermined positions and by blow-molding them.

Next, explanation will be given to preferred embodiments of the apparatus for making a plastic bottle with a handle by FIGS. 6 and 7.

This example is characterized in that a cylindrical parison with a bottom is formed by an injection mold, which is transferred in a temperature control pot, wherein the temperature of the parison is controlled to a forming temperature; the parison is transferred in the blow-mold; a handle body produced in a separate process is disposed in the blow-mold; the blow-mold is closed; and the blow-molding is performed by which the parison is integrated with the handle body.

A reference numeral 5 designates a circulating transfer means, which successively moves to the four locations of annularly disposed injection mold 51, the temperature control pot 6, the blow-mold 3 and the discharge station 52.

The circulating transfer means 5 is for instance attached to the support plate 54 as in the driving device 53, wherein a disk-like one which intermittently rotates by the driving device 53 can be adopted, and at its periphery, a required number of the neck molds 55 are provided at the respective stop positions of four locations. This neck mold 55 transfers the parison to the respective stop positions by holding the head portion 11 thereof. The neck mold 55, as shown in FIG. 7, composes a portion of the injection mold as in the outer mold 511 and the core mold 512 at the position of the injection mold 51, and specifies the shape of the neck portion 11 of the parison. Furthermore, also in the position of the blow-mold 3, it performs mold-closing collaborating with the half-cylindrical molds 31 and 32. Furthermore, at the discharge station 52, the neck mold 55 is opened and the bottle product 12 is discharged.

In this example, in the injection mold 51, a mold cavity which specifies the shapes of the parison 1, is composed of the dividable outer molds 511, the core mold 512 which specifies the inner face of the parison 1, and the neck mold 55 which specifies the shape of the neck portion 11 such as a screw portion.

Furthermore, molten synthetic resin is injected into the cavity which passes through the injection nozzle 513 from an extruder out of the system, and is cooled by the injection mold 51, by which the parison 1 is formed.

Next, the core mold 512 is drawn from the parison 1 and the outer molds 511 are opened, and by rotating the circulating transfer means 5, the parison 1 is transferred to the position of the temperature control pot 6 while being held by the neck mold 55.

Figure 8:
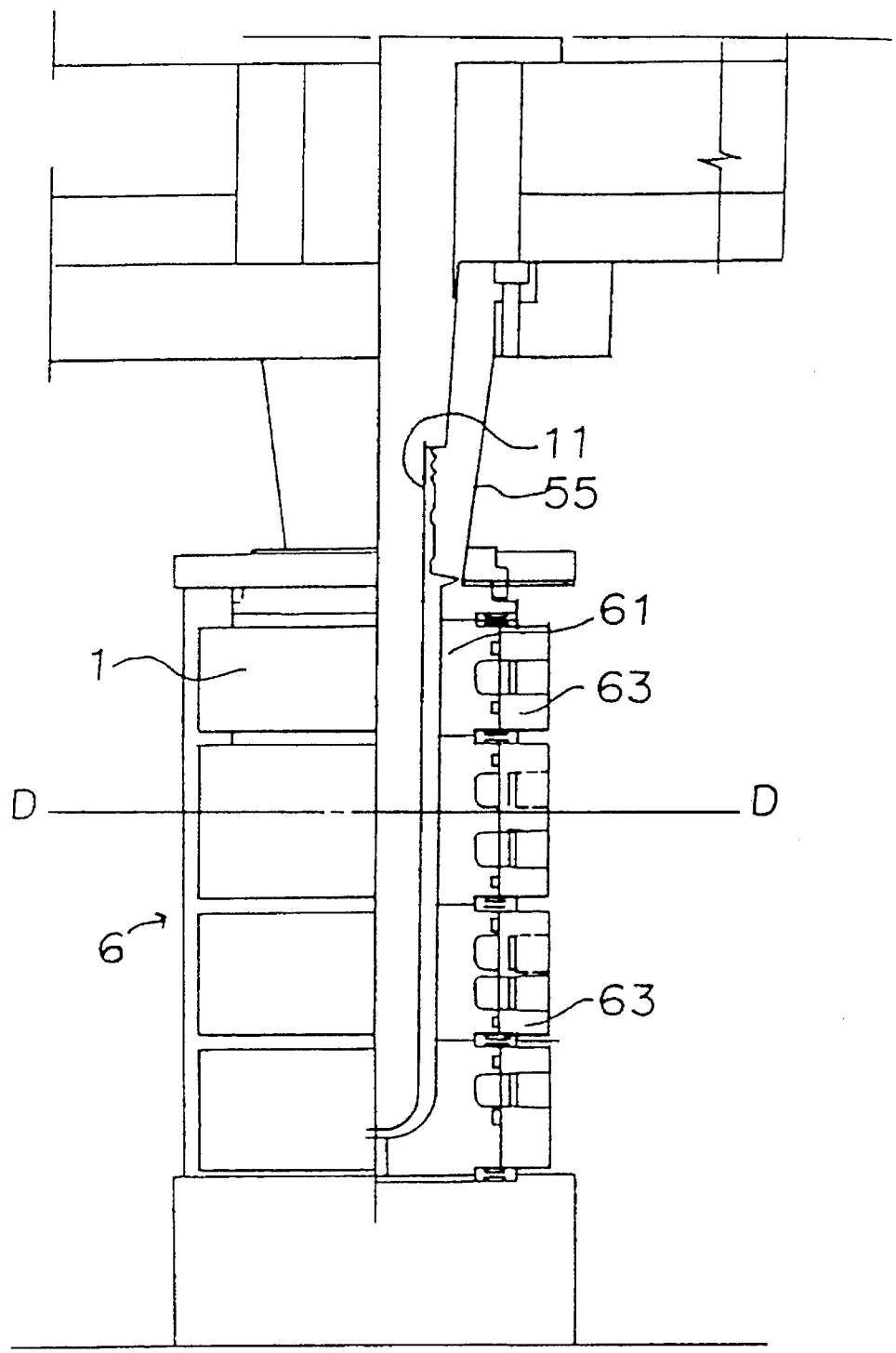
FIG. 8 is a partially broken front view of a temperature control pot.

The temperature control pot 6 is movable up and down as shown in FIG. 8, provided with the heating holes 61 which surrounds the outer side of the parison 1, and the temperature of which is controlled to a predetermined temperature by a heater. Moreover, the temperature control pot 6 engages with the parison 1 which stops at the predetermined position, covering the heating holes 61 thereon from its bottom side.

The temperature of the temperature control pot 6 is necessary to be controlled so that the temperature of the parison 1 becomes a forming temperature at the successive blow-molding stage. For instance, when polyethylene terephthalate is adopted as the synthetic resin, the temperature of the parison should be controlled at about 100° C. For instance, when the forming cycle is prolonged and surface temperature of the parison 1 is lowered to 60° C., it is necessary to control the temperature of the temperature control pot 6 at about 150° C. at the position of the surface of the parison, and when the forming cycle is shortened, and the surface temperature of the parison 1 which comes to the position of the temperature control pot, maintains the temperature of 120° C., the temperature of the temperature control pot 6 is desirable to be controlled at about 50° C. The parison 1, the temperature of which is controlled to the forming temperature as above, is transferred to the blow-mold 3 by the circulating transfer means 5 after the temperature control pot 6 comes down.

Figure 7:
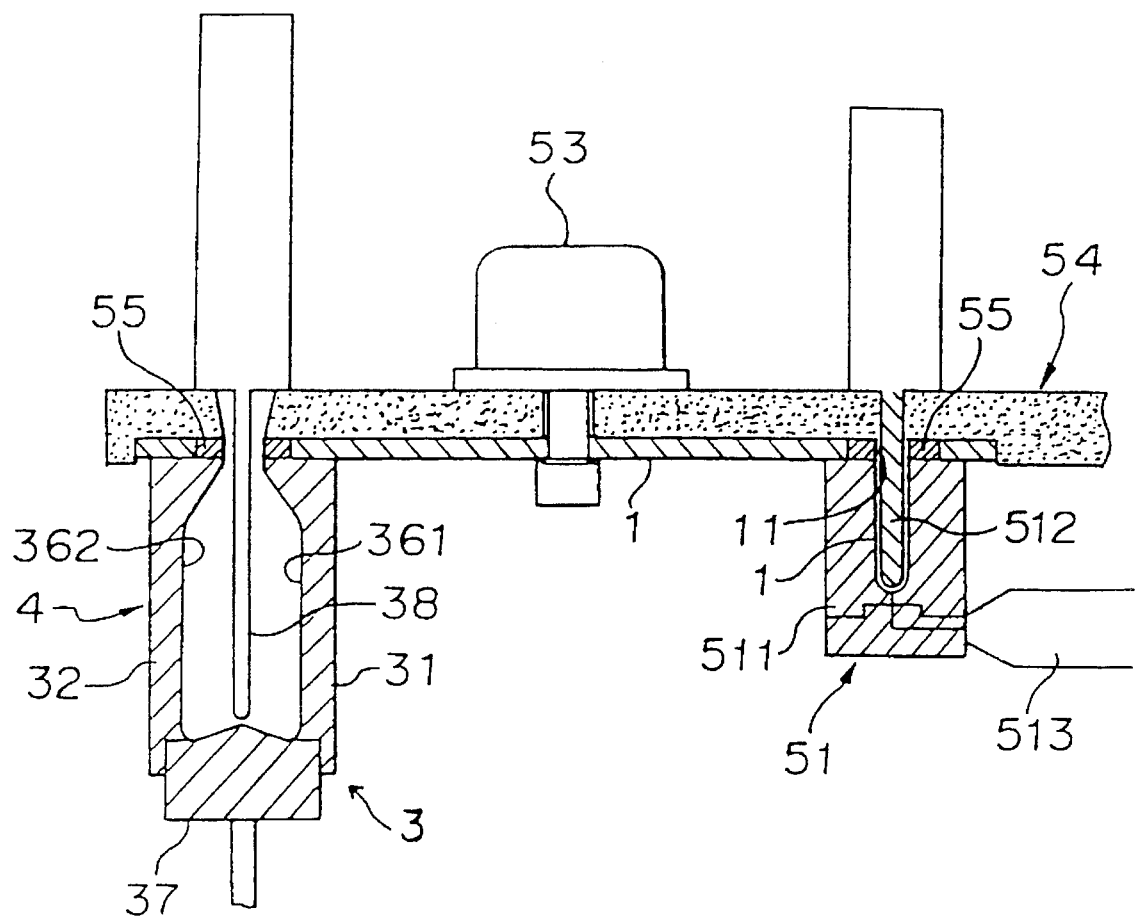
FIG. 7 is a sectional view taken along the line C—C of FIG. 6.

As shown in FIG. 7, the blow-mold 3 is composed of the half-cylindrical molds 31 and 32 and the bottom mold 37. When the blow-mold is in an open state, the parison which is held by the neck mold 55, is transferred and stops between the half-cylindrical molds.

Figure 6:
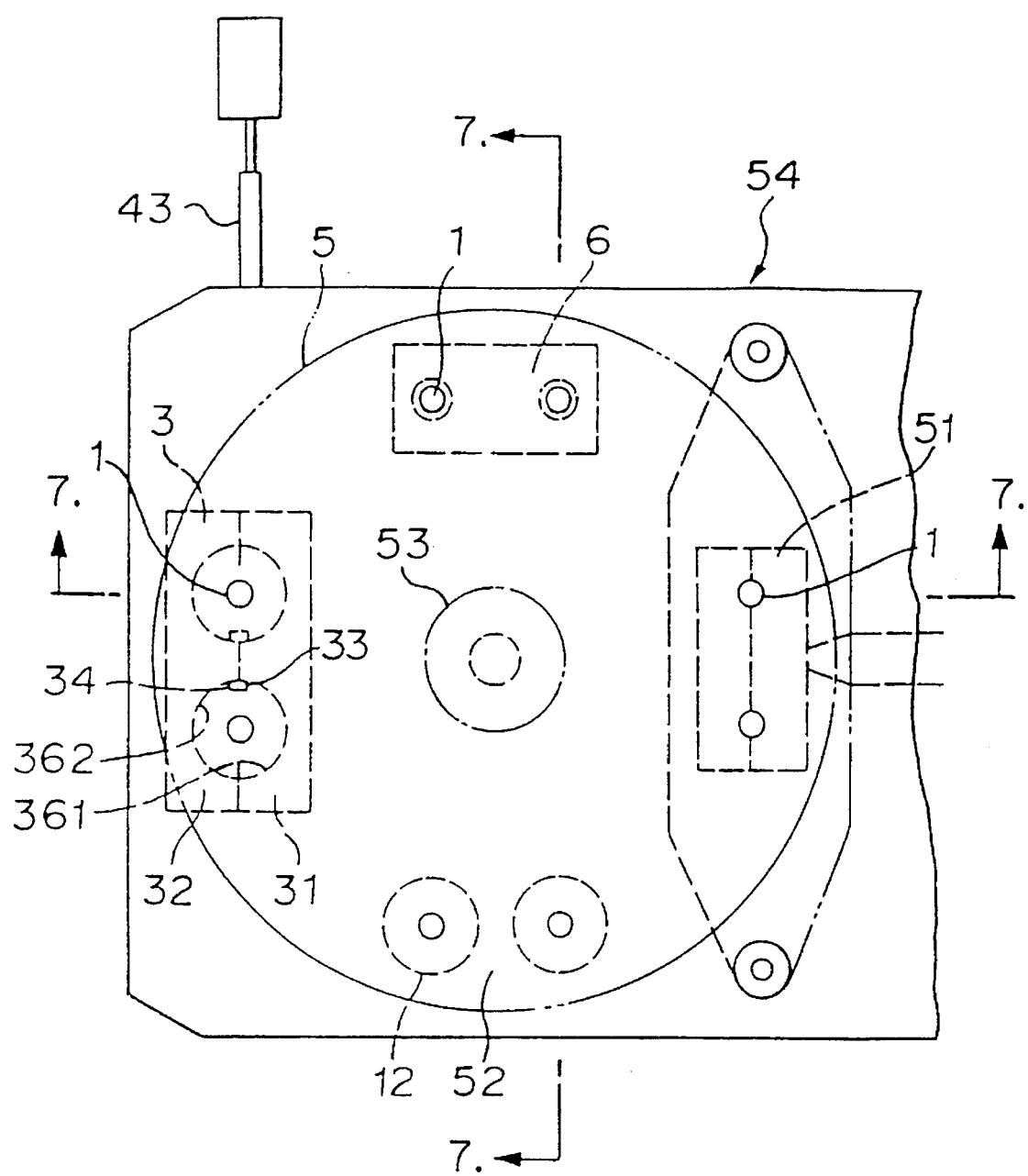
FIG. 6 is an outline plan showing an example of the total apparatus for executing the method of making a plastic bottle with a handle of the present invention.

As shown in FIG. 6, in the half-cylindrical molds 31 and 32, the mold faces 361 and 362 corresponding with the product bottle are formed and composes a blow cavity and the handle fitting grooves 33 and 34 for retaining the handle body 2 are formed.

When the parison 1 is transferred to the blow-mold 3, the handle body 2 which is produced by a separate process, is disposed in the open state of the half-cylindrical mold 31 by the handle attaching arms 43. Accordingly, when the handle body is fitted in the handle fitting groove 33, the handle attaching arm 43 returns to the original position.

When the parison 1 and the handle body 2 are disposed in the blow-mold 3, as shown in FIG. 7, the half-cylindrical molds 31 and 32 and the bottom mold 37 are combined; the blow-mold 3 is closed; the parison 1 is elongated in the axial direction by the stretch rod 38; highly compressed air is blown in the parison 1 which elongates the parison in the radial direction, by which the parison is formed in a shape of the bottle product 12, and at the same time, integrated with the handle body 2. When the blow-molding is finished, air is decompressed; the stretch rod 38 is drawn; the blow-mold 3 is opened; and the bottle product 12 is transferred to the position of the discharge station 52 while being held by the neck mold 55, in synchronism with the circulating transfer means 5. At the discharging station 52, the neck mold 52 is opened and leaves the bottle product 12, and the bottle with a handle is finally obtained.

Next, explanation will be given to FIGS. 8 through 10.

Figure 9:
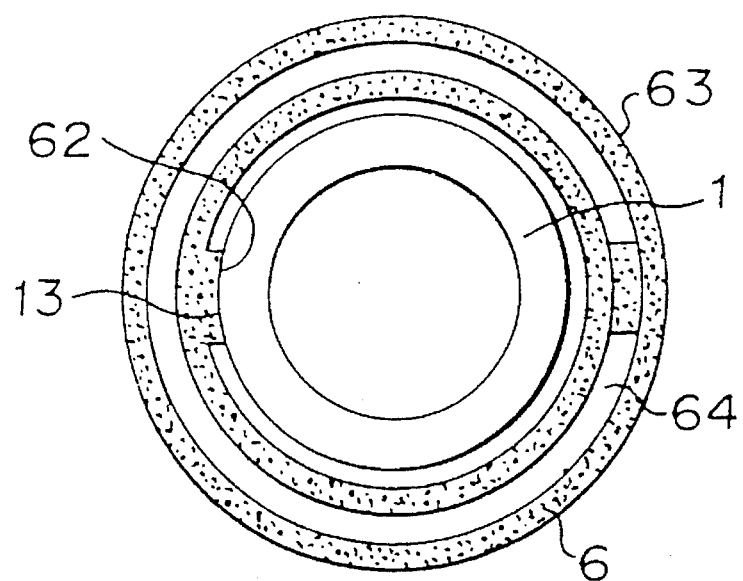
FIG. 9 is a horizontal sectional view taken along the line D—D of FIG. 8.
Figure 10:
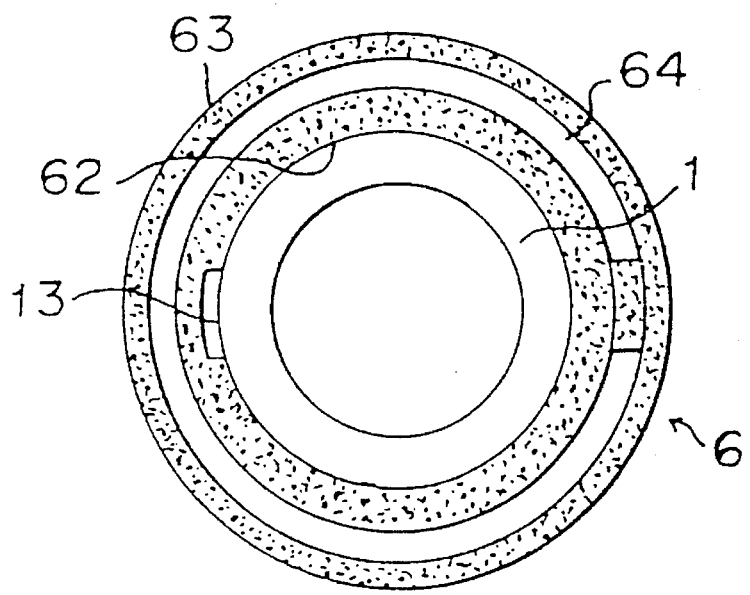
FIG. 10 is a horizontal sectional view showing another example of the temperature control pot.

FIGS. 8 through 10 show an example of the detailed structure of the temperature control pot 6.

In this temperature control pot, the parison 1 contacts the pot wall 62 of the temperature control pot 6 only at a predetermined portion, and only the contact portion is heated or cooled. By generating temperature distribution in the circumferential direction of the parison 1, the thickness distribution of the bottle product 12 can be controlled.

When the parison temperature at the time when the parison is removed from the injection mold 51, is elevated, the parison 1 is cooled in the temperature control pot 6, whereas when the parison temperature is lowered, the parison 1 is heated in the temperature control pot 6. Generally speaking, in using the parison made of polyethylene terephthalate, the temperature of the parison is necessary to be controlled to a temperature pertinent to elongating blow-molding of 90° through 110° C.

However, in the above temperature control of the parison, since the temperature in the preferred direction of the parison becomes uniform, it is suitable to form a bottle of a body of rotation or in a shape similar to that, since the wall thickness in the peripheral direction of the bottle is liable to be uniform. However, it is not a suitable method when the wall thickness of the bottle is to be thickened at a predetermined portion in the peripheral direction, such as in a bottle with a handle made of polyethylene terephthalate having a considerably non-rotating shape.

In order to thicken the wall thickness of the bottle at a predetermined position in the peripheral direction, the temperature of the parison portion corresponding with the predetermined portion should be lowered more than those of the other peripheral portions.

For doing this, it is found that a method is effective in which the parison 1 and the wall 62 of the temperature control pot are contacted at a predetermined portion, by which the temperature of this parison contacting portion is lowered or elevated.

Concretely, when the temperature of the parison which is withdrawn from the mold, is higher than the elongating blow-molding temperature $t_B$, as shown in FIG. 9, the temperature of the temperature control pot 6 is lowered below $t_B$, by which the temperature of the parison at the portion which contacts the pot wall 62, is lowered more than those in the other peripheral portions.

When the temperature of the parison which is withdrawn from the mold is lowered more than $t_B$, as shown in FIG. 10, the temperature of the temperature control pot is elevated above $t_B$ by which the temperature of the parison at the portion which contacts the pot wall 62, should be elevated more than the temperature of non-contacting portion.

In short, the temperature difference in the peripheral direction of the parison is to be generated by partially contacting the pot wall 62 of the temperature control pot and the parison 1.

Generally, this temperature difference is pertinent at 2° to 5° C. It is not effective under 2° C. When it exceeds 5° C., the elongating blow-molding becomes difficult.

As shown in FIG. 8, the temperature control pot 6 utilizes the four jackets 63. In the respective jacket, the oil circulating layer 64 is formed, and an oil at 70° to 100° C. is circulated, by which the temperature control is performed.

FIG. 9 shows a sectional view taken along the line D—D of the parison 1 and the temperature control pot 6. In the bottle product 12, the portion of the parison 13 corresponding with the handle attaching portion which is required to have a thicker wall, is contacted to the pot wall 63, and is cooled more than the other portion in the peripheral direction. The cooling may be performed at the portion thereof in the axial direction or in all the face thereof.

This temperature control pot 6 has a characteristic in which the wall thickness on the handle attaching side of the bottle can be increased in the elongating blow-molding, by lowering a temperature of the parison 1 in a predetermined portion in the peripheral direction, for instance, the parison portion corresponding to the handle attaching portion, in case of the bottle with the handle shown in FIG. 2, thereby considerably promoting the handle attaching strength of the handle with a bottle.

Figure 18:
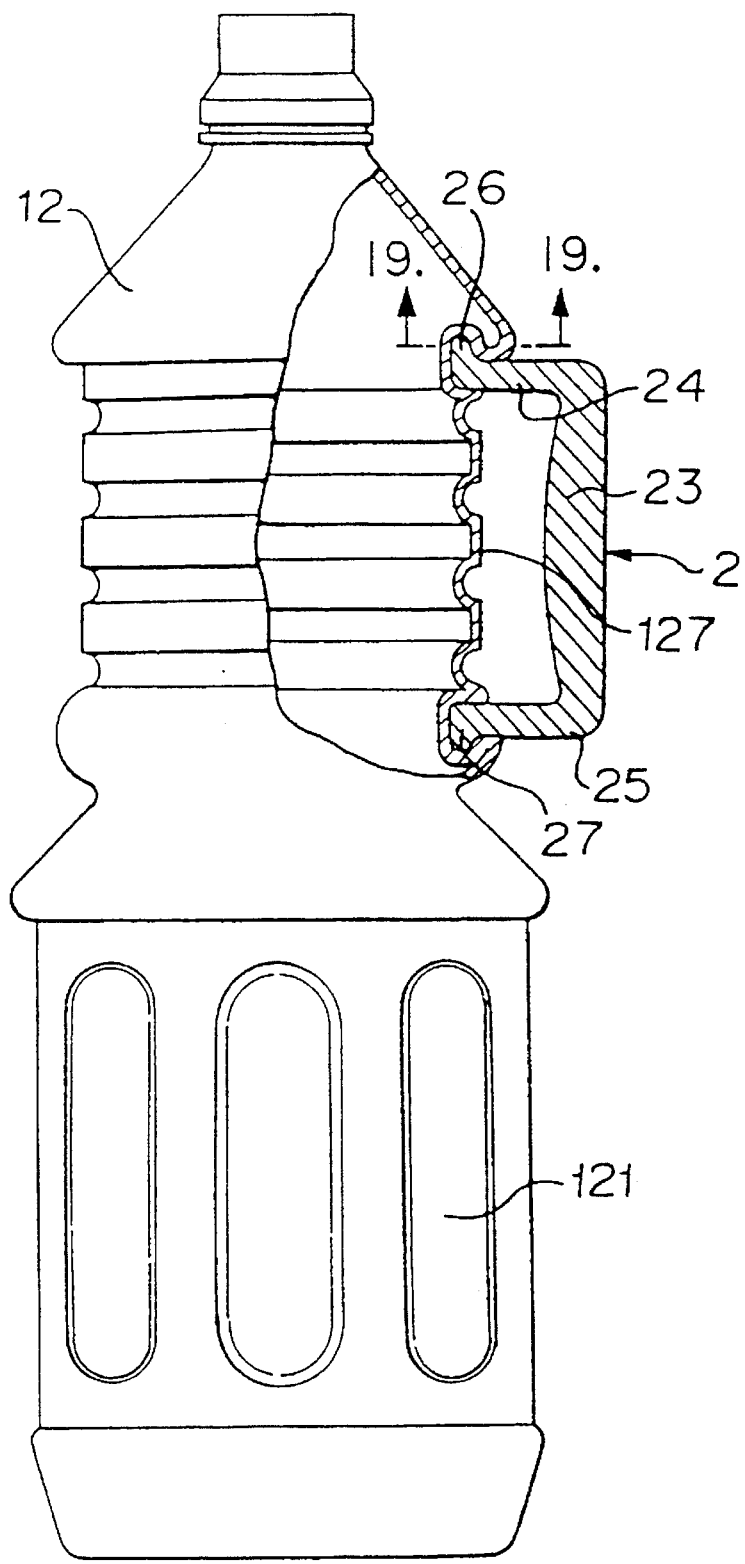
FIG. 18 is a partially sectional front view showing a fourth example of the plastic bottle with a handle which is obtained from the present invention.

The bottle having the pressure reduction absorbing face 121 as shown in FIG. 18, has a characteristic wherein it becomes possible to thicken the vertical rib portion 122 which maintains the pressure reduction absorbing face, thereby promoting the pressure reduction resistance.

Next, explanation will be given to FIG. 11.

Figure 11:
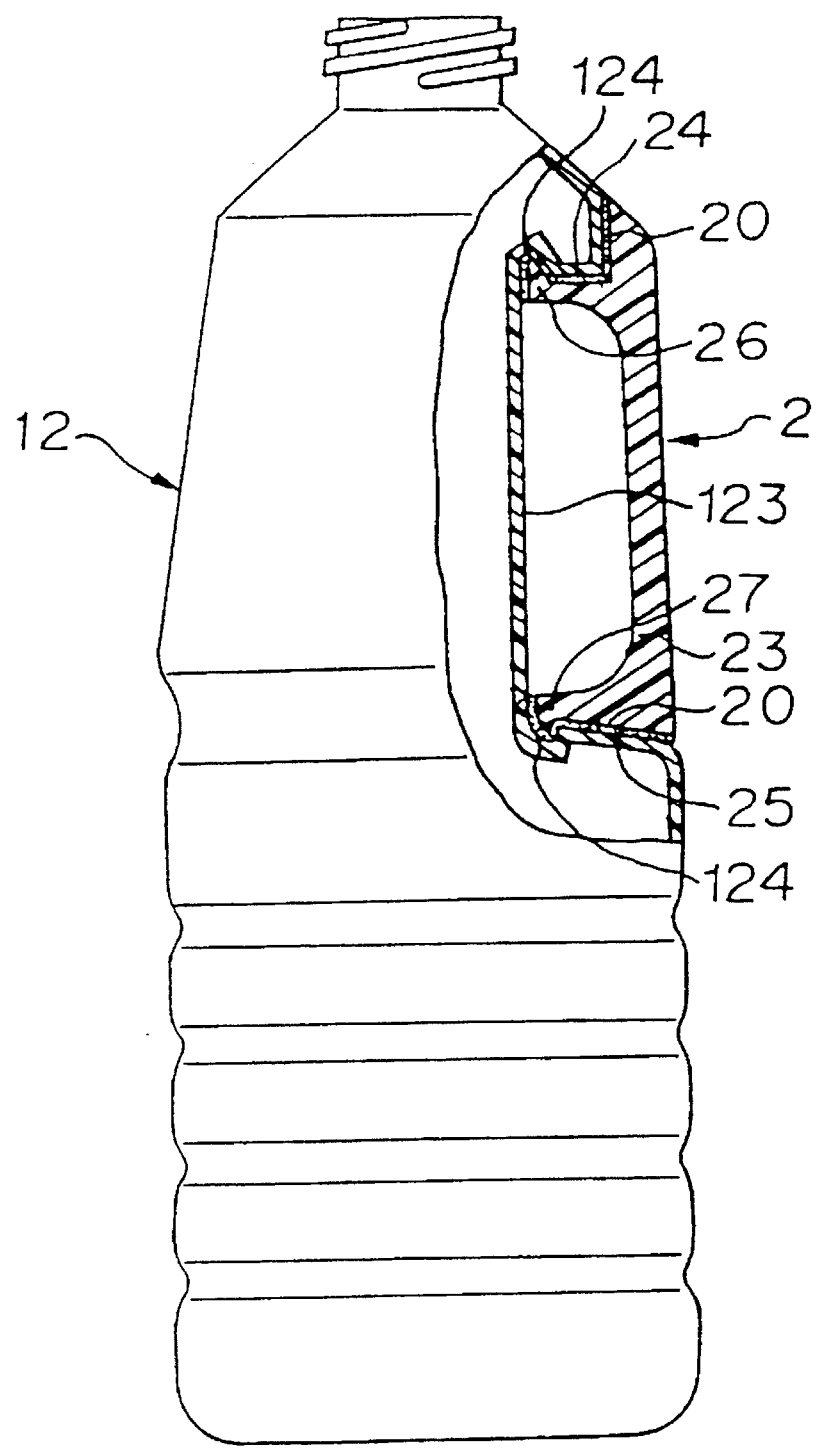
FIG. 11 is a partially sectional front view showing a first example of a plastic bottle with a handle which is obtained from the present invention.

In this example, as shown in FIG. 11, the hot melt adhesive agent 20 having an adhesiveness at normal temperature, is coated at the portion of the handle body 2 which connects with the main body of the bottle; the handle body 2 is disposed in the blow-mold of the bottle; pressurized fluid is blown into the parison; the main body of the bottle 12 is blow-molded; and the main body of the bottle 12 and the connecting portion of the handle body 2 are connected.

In producing such a plastic bottle with a handle, first of all, the handle body 2 is produced by injection molding of polypropylene, polyethylene or the like, and the hot melt adhesive agent 20 having an adhesive strength at normal temperature, is coated on the connecting surfaces between the attaching portions 24 and 25 and engaging protrusions 26 and 27, and the main body of the bottle 12.

The hot melt adhesive agent 20 having an adhesive strength at normal temperature, mentioned above, signifies an adhesive agent which is not hardened and displays adhesiveness even when it is cooled down to the normal temperature and which can keep softness and adhesiveness without being hardened over a long period. Moreover, such softness is of a degree of in which viscoelastic deformation is easily caused at the temperature lower than 40° C., and internal stress relaxation is achieved in several hours to in several days, and the adhesive agent maintains the practical adhesive strength all through before and after the period. Compared with that every conventional normal adhesive agent or every normal hot melt adhesive agent has little adhesive strength when it is solidified, in the hot melt adhesive agent having the adhesive strength at normal temperature, the adhesive strength is maintained for a long time.

When the hot melt adhesive agent 20 having the adhesive strength at normal temperature, is coated, a method is pertinent wherein the hot melt adhesive agent 20 which is molten at about 150° C., is coated in a band by using a hot melt applicator or the like. Furthermore, the time interval between when the hot melt adhesive agent 20 is coated, to when the main body of the bottle and handle are integrated in the blow-molding, is desirable to be as short as possible. In case of this hot melt adhesive agent 20, there is practically no problem when the time interval is within 5 to 10 seconds. Even when it requires more time, the hot melt adhesive agent can maintain a sufficient adhesive strength.

Next, the handle body 2 coated with the hot melt adhesive agent 20 and the parison for forming the main body of the bottle 12, are set in the blow-mold 3 of the bottle, pressurized fluid is blown in the parison, and the main body of the bottle 12 is blow-molded. At this moment, the parison 1 is expanded so that it wraps up the engaging protrusions 26 and 27 of the handle body 2, contacts the attaching portions 24 and 25 and faces of the engaging protrusions 26 and 27 coated with the hot melt adhesive agent 20, and the main body of the bottle 12 and the handle body 2 are integrated as shown in FIG. 11.

At this point, explanation will be given to an example wherein the plastic bottle with a handle is produced based on the above method.

The parison obtained from polyethylene terephthalate resin having the intrinsic viscosity of 0.75, is heated at about 100° C. by a heater.

On the other hand, as a handle body, the one which is formed by injection molding of polypropylene, polyethylene or the like, is utilized, and the hot melt adhesive agent (commercial name: EVERGRIP PS-1: made by ACI Japan) having an adhesiveness at normal temperature, is applied with a normal hot melt applicator by 2 g at two locations of the portions corresponding with the engaging portion with the bottle.

Next, a plastic bottle with a handle having the inner volume of 1.8 l, the height of 300 mm, and the bore diameter of 106 mm, by the method explained as above.

Table 1 shows the result of measuring the attaching strength of the plastic bottle with a handle formed as above, for the respective cases of kinds of the hot melt adhesive agent and with or without engaging of the main body of the bottle with the handle, and Table 2 shows the result of measuring the change of the adhesive strength by the coating amount of the hot melt adhesive agent having the adhesiveness at normal temperature. According to these Tables, it is found that by utilizing the hot melt adhesive agent having the adhesiveness at normal temperature, the attaching strength is promoted irrespective of with or without of the engaging of both, and that the attaching strength of the handle is maximized by coating 1 to 2 g of the hot melt adhesive agent having the adhesiveness at normal temperature.

TABLE 1

| | Kinds of hot melt adhesive agent and attaching strength of handle | |
|---|---|---|
| | Normal temperature adhesive type hot melt adhesive agent | Normal temperature hardening type hot melt adhesive agent |
| Bottle and handle engaging type | 180 Kg | 130 Kg |
| Bottle and handle adhering type | 60 Kg | 40 Kg |

TABLE 2

Coating amount of hot melt adhesive agent and attaching strength

| Coating amount of hot melt adhesive agent | Attaching strength |
| --- | --- |
| 0 g | 150 Kg |
| 1 g | 170 Kg |
| 2 g | 180 Kg |
| 3 g | 160 Kg |
| 5 g | 150 Kg |
| 10 g | 150 Kg |

Furthermore, in this example, when a protrusion is provided to the handle body, and when the main body of the bottle is blow-molded, wherein a portion of the wall face of the main body of the bottle engulfs the protrusion, by which the handle is engaged with the main body of the bottle. The engaging portion of the handle is not restricted to the one provided with the protrusion, and may be the one wherein a recess or a hole or the like is provided, by which the handle is engaged with the main body of the bottle.

Furthermore, this example can be applied to the handle which is attached to a bottle having comparatively small size, and which adheres to the blow-molded bottle without providing a special engaging portion.

Furthermore, this handle may be provided with a temperature sensitive element which changes its color by temperature, by which an inside temperature of a refrigerator or the like is displayed, or the color is changed corresponding to the temperature of a hand when the handle is gripped by a hand.

Next, explanation will be given to a preferred embodiment of the structure of the bottle with a handle which is obtained by the present method of invention by FIGS. 12 through 17.

The example of FIGS. 12 through 17 is characterized in that the recess portion 123 for attaching the handle to the side face of the main body of the plastic bottle 12, is formed, and the plastic bottle with the handle is composed by attaching a separate handle body 2 to this recess portion, and the horizontal cross section shape of the main body at the upper side and the lower side of the hand attaching portion of the recess portion 123, forms a corner which is protruded outwardly.

Figure 12:
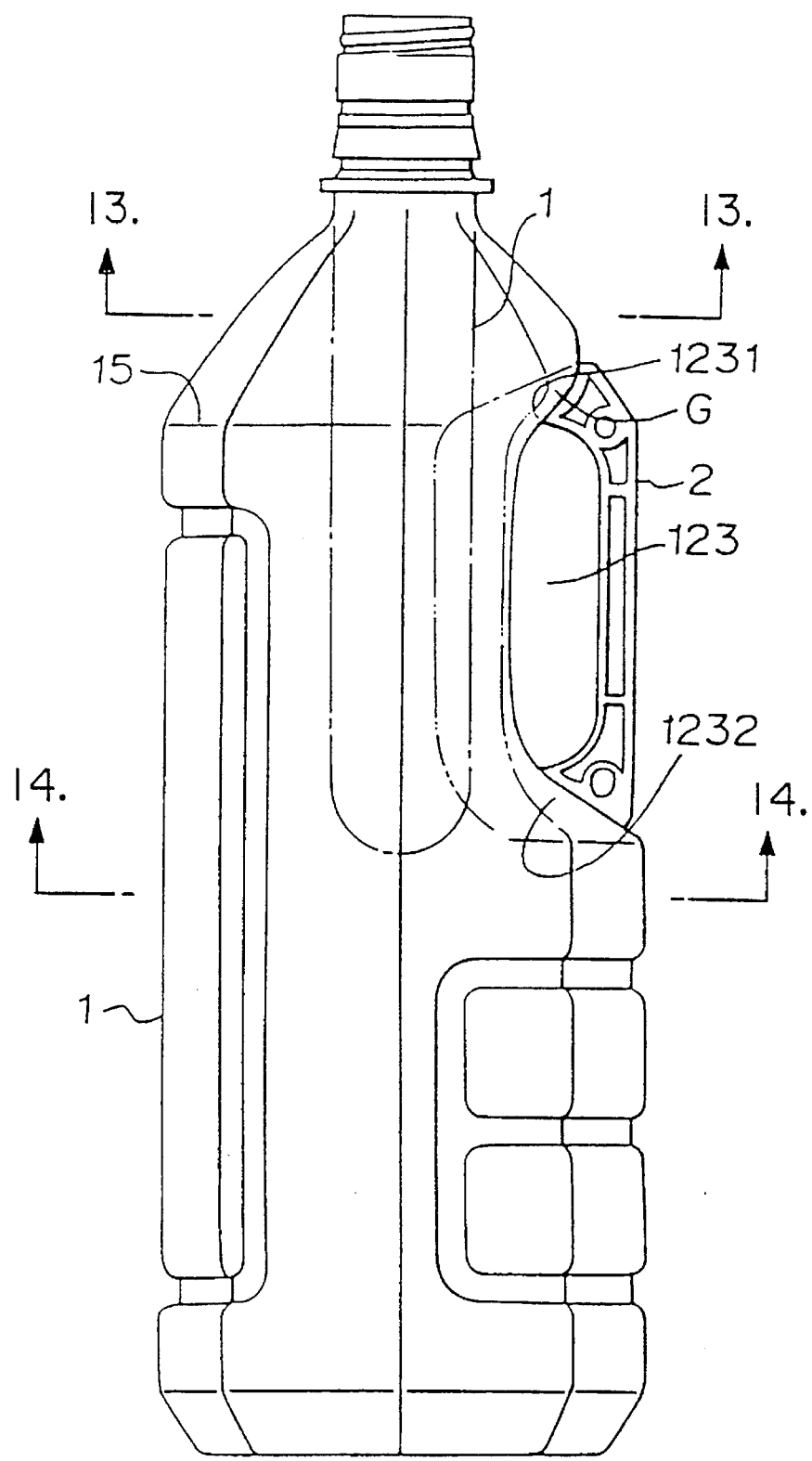
FIG. 12 is a partially sectional front view showing a second example of the plastic bottle with a handle which is obtained from the present invention.
Figure 13:
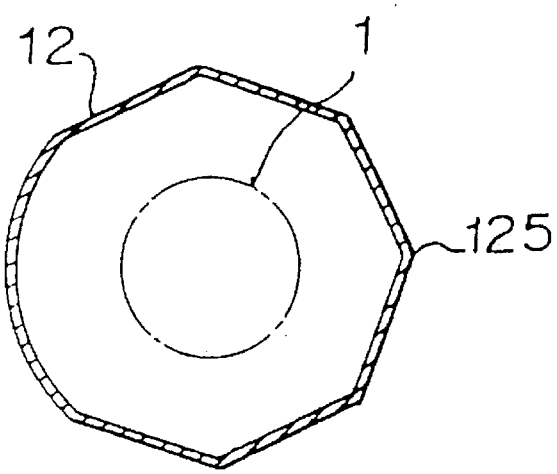
FIG. 13 is a sectional diagram taken along the line E—E of FIG. 12.
Figure 14:
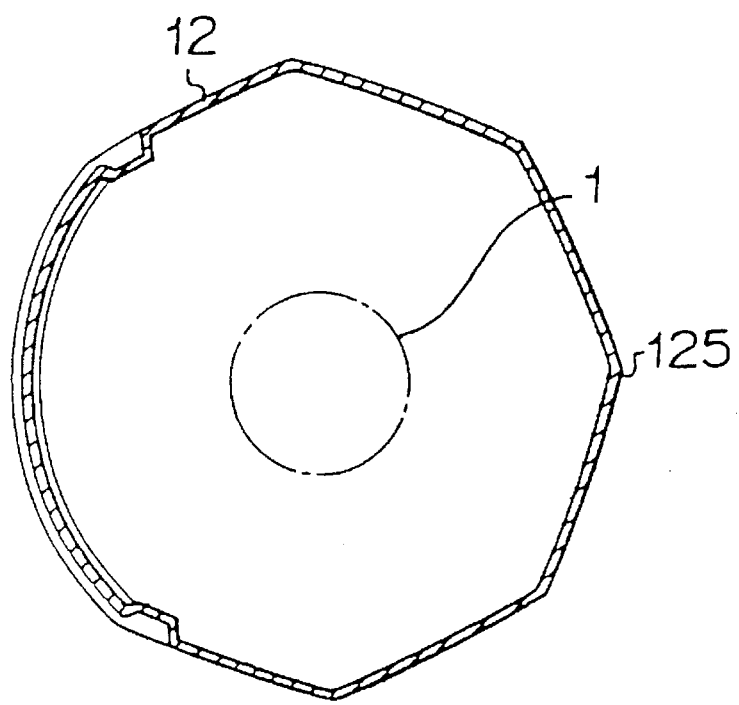
FIG. 14 is a sectional view taken along the line F—F of FIG. 12.

In the example shown in FIGS. 12 to 14, the main body of the plastic bottle 12 has a roughly heptagonal columnar total shape, and the handle attaching recess portion 123 is formed by cutting off an edge thereof. By this, the upper side of the handle attaching portion of the recess portion 123, as shown in FIG. 13, and the lower side thereof, as shown in FIG. 14, form an angle of the heptagon, respectively, that is, the corner portion 125 which is protruded outwardly. Since in these corner portions 125, as shown in FIGS. 13 and 14, the distances from the preform 1 are larger than those of adjacent faces, the elongation oriented degrees of the upper face 1231 and the lower face 1232 of the recess portion 123 are enlarged to that degree and those faces are strengthened, thereby promoting the attaching strength of the handle body 2.

Figure 15:
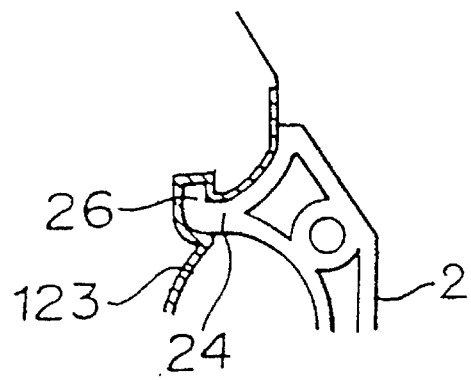
FIG. 15 is a sectional view of G portion of FIG. 12.

In the example of FIG. 15, the attaching portion 24 which is inwardly extended from the top end of the handle body 2, is formed, and the fitting protrusion 26 is formed at the end portion of the attaching portion 24, thereby fixing the wall of the handle attaching portion of the recess portion 123 to the fixing protrusion 26, so that the wall wraps it up. Since the fixing protrusion 26 is located at an inward portion of the recess portion 123, that is, a portion adjacent to the center thereof, and the wall of the handle attaching portion of the recess portion is not so much elongated, and the flow resistance is small, the wall is firmly fixed to the fixing protrusion 26 since the wall reaches around the surrounding corners of the small fixing protrusion.

Figure 16:
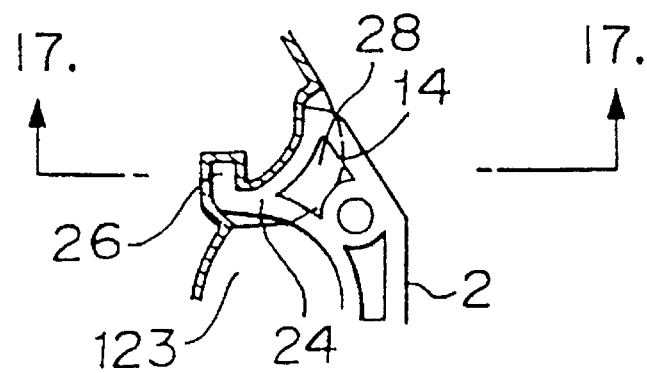
FIG. 16 is a partially sectional front view showing a third example of the plastic bottle with a handle which is obtained by the present invention.
Figure 17:
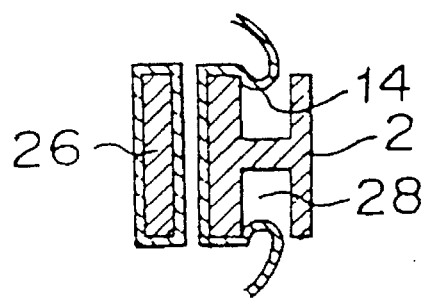
FIG. 17 is a sectional view taken along the line H—H of FIG. 16.

Furthermore, in the example of FIG. 16, as shown in the dotted line 14, the wall at the upper face of the recess portion 123, is more firmly fixed to the attaching portion 24, since the wall reaches around the both faces of the neck portion of the attaching portion. Furthermore, the recessed engaging portions 28 are provided at the side faces of the handle body 2, and the wall which reaches around the both faces, invades into the recessed engaging portions 28 as shown in FIG. 17 thereby ensuring the fixing. Moreover, as shown in FIG. 12, since the attaching faces of the upper face 1231 and the lower face 1232 of the recess portion 123 are slanted so that they narrow down inwardly, and also the upper face and the lower face of the attaching portions 24 and 25 of the handle body 2 are slanted, the contact area thereof is widened and the stress is alleviated, thereby promoting the attaching strength. When the upper face 1231 and the lower face 1232 of the recess portion 123 are slanted so that they narrow down inwardly, the parison is uniformly elongated as a whole in forming the main body of the bottle 12, a partially low elongation portion is hard to be generated, thereby promoting the reinforcing effect. Especially when the shoulder portion 15 of the main body of the bottle 12 is located on the lower side of the upper attaching portion 24 of the handle body 2, the elongation effect of the upper face 1231 of the recess portion is more enhanced.

Figure 19:
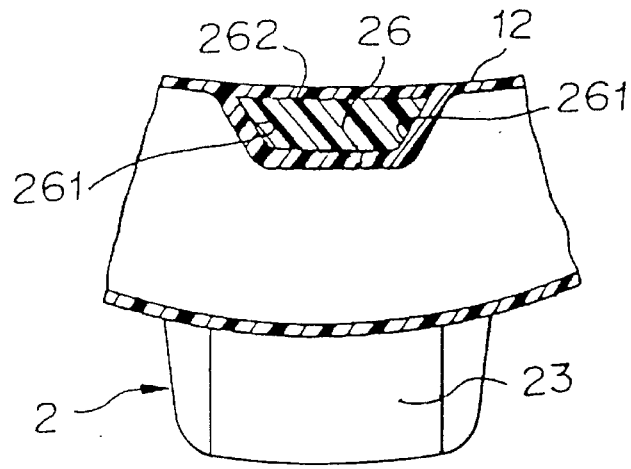
FIG. 19 is a sectional view taken along the line I—I of FIG. 18.
Figure 20:
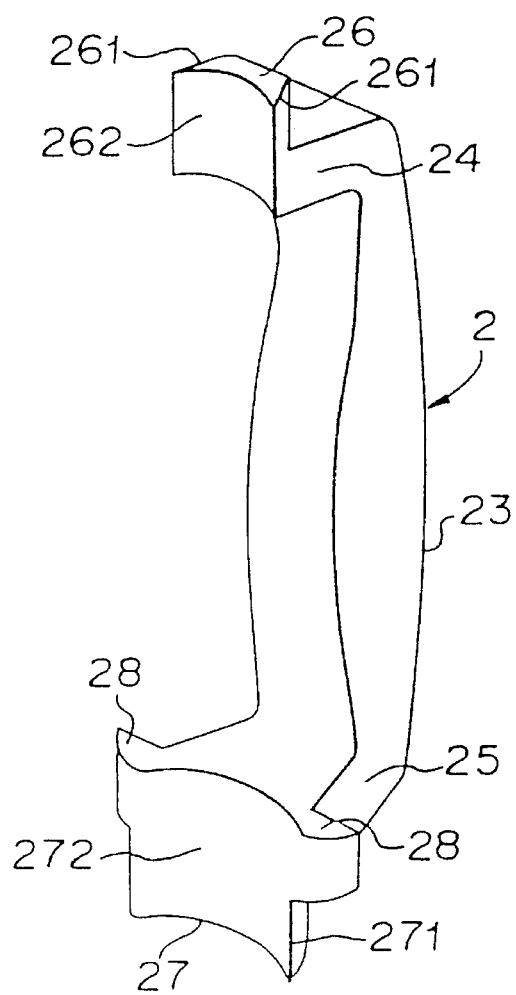
FIG. 20 is a perspective view of the handle body.

Next, explanation will be given to the example shown in FIGS. 18 to 20. This plastic bottle with a handle is characterized in that in the plastic bottle with a handle wherein the main body of the bottle 12 is attached with the handle body 2 having the grasping portion 23, the attaching portions 24 and 25 extended horizontally from the grasping portion 23, and the fitting protrusions 26 and 27 provided at the ends of the attaching portions 24 and 25, in their attaching portions, the wall portion of the main body of the bottle engages with the fixing protrusions 26 and 27, so that the wall wraps up the protrusions, and the cross sectional shapes of the fitting protrusions 26 and 27 are formed like a trapezoid of which the long side is on the side of the center of the bottle.

As shown in FIG. 18, in the plastic bottle with a handle, the handle body 2 which is formed separately with a main body of the bottle 12 is attached to the upper side face 127 of the main body of the bottle 12.

The handle body 2 is composed of the grasping portion 23, the attaching portions 24 and 25 which are extended horizontally from both upper and lower end portions of the grasping portion 23 to the side of the center of the bottle 12, and the fitting protrusions 26 and 27 which are extended in the vertical direction of the bottle respectively from the end portions of the attaching portions 24 and 25.

Moreover the cross sectional shapes of the fitting protrusions 26 and 27 are formed in trapezoids of which longer sides are on the side of the center of the bottle 12, wherein the short side edges 261 and 271 in the radial direction of the bottle, are slanted so that the bottle center side thereof is wide and the outer periphery side thereof is narrow, and the long side edges 262 and 272 in the tangential direction of the bottle are roughly parallel.

This handle body 2 is attached to the main body of the bottle 12 so that the fitting protrusions 26 and 27 are invadingly imbedded into the wall portion of the upper side face 127 of the main body of the bottle 12.

Since the shapes of the fitting protrusions 26 and 27 are formed into trapezoids, the wall portion of the main body of the bottle 12 can sufficiently reach around the periphery surfaces of the fitting protrusions 26 and 27 from the long side edges 262 and 272 on the side of the center of the bottle. Furthermore, even when the wall portion of the main body of the bottle 12 is deformed, the fitting protrusions are hardly disengaged from the wall portion, since the wall portion invadingly reaches around the fitting protrusions 26 and 27.

Accordingly, the handle attaching strength can be promoted by providing the fitting protrusions 26 and 27 which are formed on the handle body 2, at end portions of the attaching portions 24 and 25, and by forming the cross sectional shapes thereof into trapezoids.

By the way, as for the shape of the fitting protrusions 26 and 27, the widths of the long side edges 262 and 272 may be the same with those of the attaching portions 24 and 25 or they may be larger than those of the attaching portions 24 and 25. The cross sectional shape is not necessarily to be a complete trapezoid, and it may have curved faces or bent portions. Furthermore, as shown in FIG. 20, the horizontal protrusion 28 is provided at a side face at ends of the attaching portions 24 and 25, thereby enhancing the attaching strength.

Finally, explanation will be given to the example shown in FIGS. 21 and 22.

In this example, a bottle with a handle is characterized in that the handle body 2 having the grasping portion 23 and the attaching portions 24 and 25 which are horizontally extended from the grasping portion, is attached to the recess portion 123 for attaching the handle, which is formed at the upper side face of the main body of the bottle 12, by invadingly engaging the fitting portions 263 and 273 provided over the whole width of the ends of the handle attaching portions, with the inward wall face 1233 of the recess portion 123, and the horizontal cross sectional shape of the end faces 2631 and 2731 of the fitting portions 263 and 273 are formed into outwardly concave curved faces.

Figure 22:
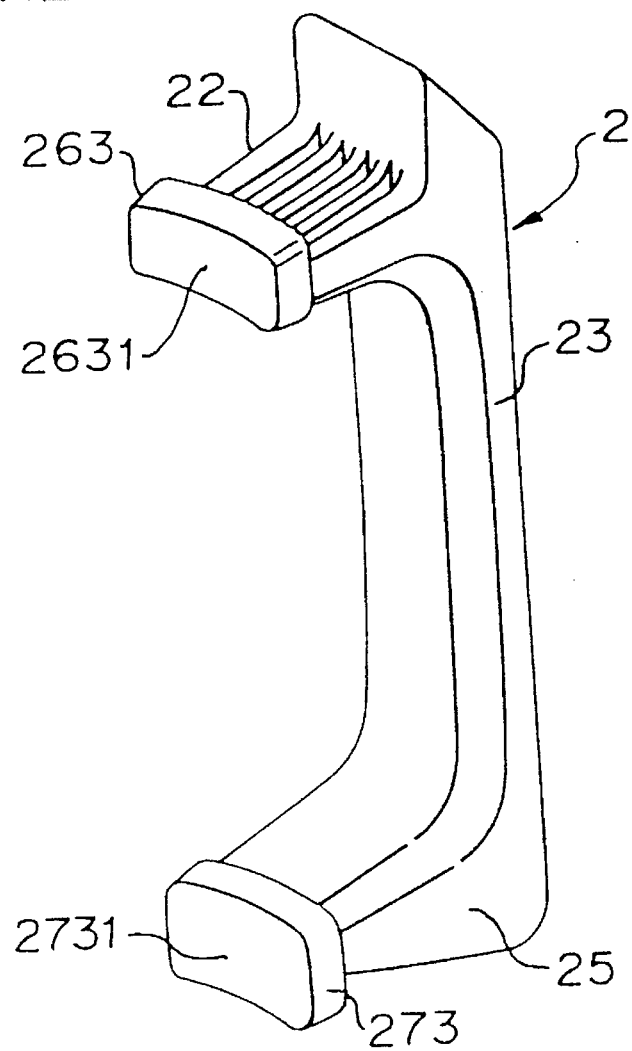
FIG. 22 is a perspective view of the handle body in FIG. 21.

In this example, the handle body 2 has the grasping portion 23 and the attaching portions 24 and 25 which are horizontally extended from the grasping portion 23, and in the example of FIG. 22, the attaching portions 24 and 25 are horizontally extended from the top and the bottom of the grasping portion 23 respectively, thereby forming a side way channel shape as a hole.

The fitting portions 263 and 273 are formed at the ends of the attaching portions 24 and 25 over the whole width, and in the example of FIG. 22, it is formed like a flange wherein it extends outward over the whole periphery of the ends of the attaching portions 24 and 25.

Figure 21:
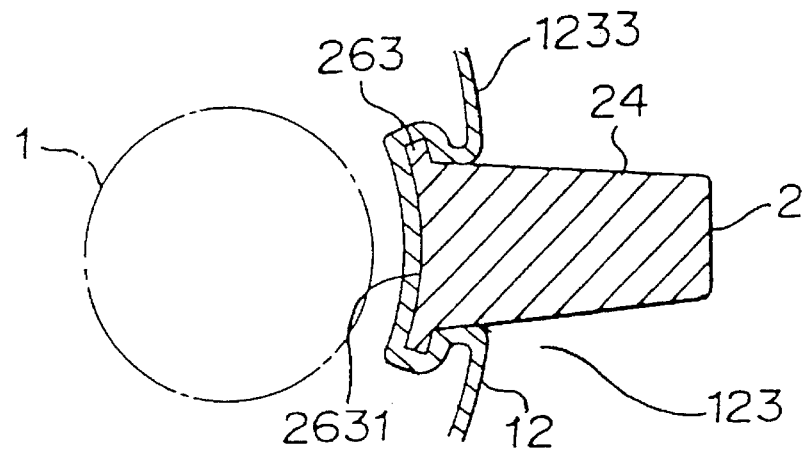
FIG. 21 is a sectional view taken along the line I—I of FIG. 18 showing another example of the handle body.

As shown in FIG. 21, this handle body 2 is attached to the recess portion 123 for attaching the handle which is formed at the upper side face of the main body of the bottle 12, and the fixing portions 263 and 273 at the ends of the supporting portions invadingly engage with the inward wall face 1233 of the recess portion 123. At this time, since the fixing portions 263 and 273 are formed over the whole width of the ends of the attaching portions as shown in FIGS. 21 and 22, and the cross sectional shapes of the end faces 2631 and 2731 of the fixing portions 263 and 273 are formed into outwardly concave curved faces, the inward wall face 1233 contacting the end faces 2631 and 2731 is secured in a wide area, and by the outwardly concave curved shape to hold around the wall, the external force applied on the handle body 2 is dispersed, the deformation of the inward wall face 1233 is prevented and the attaching strength thereof is promoted.

What is claimed as new and desired to be secured by Letters Patent of the United States is:

1. A bottle comprising:
   a main body having a recess, said recess having a slanted upper face and a slanted lower face; and
   a handle body attached to said recess;
   wherein said main body defines a columnar shape having a plurality of edges, and said recess comprises a handle attaching portion at upper and lower sides of said recess, said handle attaching portion being formed by cutting off an edge of said main body, said handle attaching portion comprising corner portions which protrude radially outwardly and form an angle at a side of the columnar shape of the main body.

2. A bottle according to claim 1, wherein said handle attaching portion has a fitting protrusion which is insertable in a receiving portion of said recess.

3. A bottle according to claim 1, wherein said columnar shape of said main body is an approximately heptagonal columnar shape.

4. A plastic bottle with a handle comprising:
   a main body of a plastic bottle; and
   a handle body;
   wherein a recess portion is formed at a side face of the main body of the plastic bottle for attaching the handle body which has separately been formed, the recess portion comprising an upper attaching face and a lower attaching face for respectively receiving an upper attaching portion and a lower attaching portion of said handle body; and
   wherein said main body of the plastic bottle comprises a shoulder portion which is positioned vertically below the upper attaching portion of the handle body;
   wherein:
   the upper attaching face of the recess portion downwardly slants towards a center axis of the main body of the plastic bottle, and the lower attaching face of the recess portion upwardly slants towards the center axis of the main body of the plastic bottle; and
   the upper attaching portion of said handle body comprises an upper face which downwardly slants towards the center axis of the main body of the plastic bottle, and the lower attaching portion of the handle body comprises a lower face which upwardly slants towards the center axis of the main body of the plastic bottle.

5. The plastic bottle with a handle according to claim 4, wherein recessed engaging portions are provided at side faces of a neck portion of the attaching portion of the handle body and a wall at an upper face of the recess portion reaches around the side faces of the attaching portion and invades into the recessed engaging portions.

6. The plastic bottle with a handle according to claim 4, wherein horizontal cross section shapes of the main body of the plastic bottle at an upper side and a lower side of the recess portion for attaching the handle body in view of a handle attaching portion thereof form corner portions protruding outwardly.

7. The plastic bottle with a handle according to claim 5, wherein horizontal cross section shapes of the main body of the plastic bottle at an upper side and a lower side of the recess portion for attaching the handle body in view of a handle attaching portion thereof form corner portions protruding outwardly.

8. The plastic bottle with a handle according to claim 4, wherein said main body of the plastic bottle defines an approximately heptagonal columnar shape.

* * * * *